April 15, 1958  J. J. McGILLIS ET AL  2,830,764
CONTROL APPARATUS FOR HOT WATER HEATING SYSTEMS
Filed Dec. 7, 1953  2 Sheets-Sheet 1

INVENTORS
John J. McGillis
Hugh L. McGillis
BY
John H. McKenna

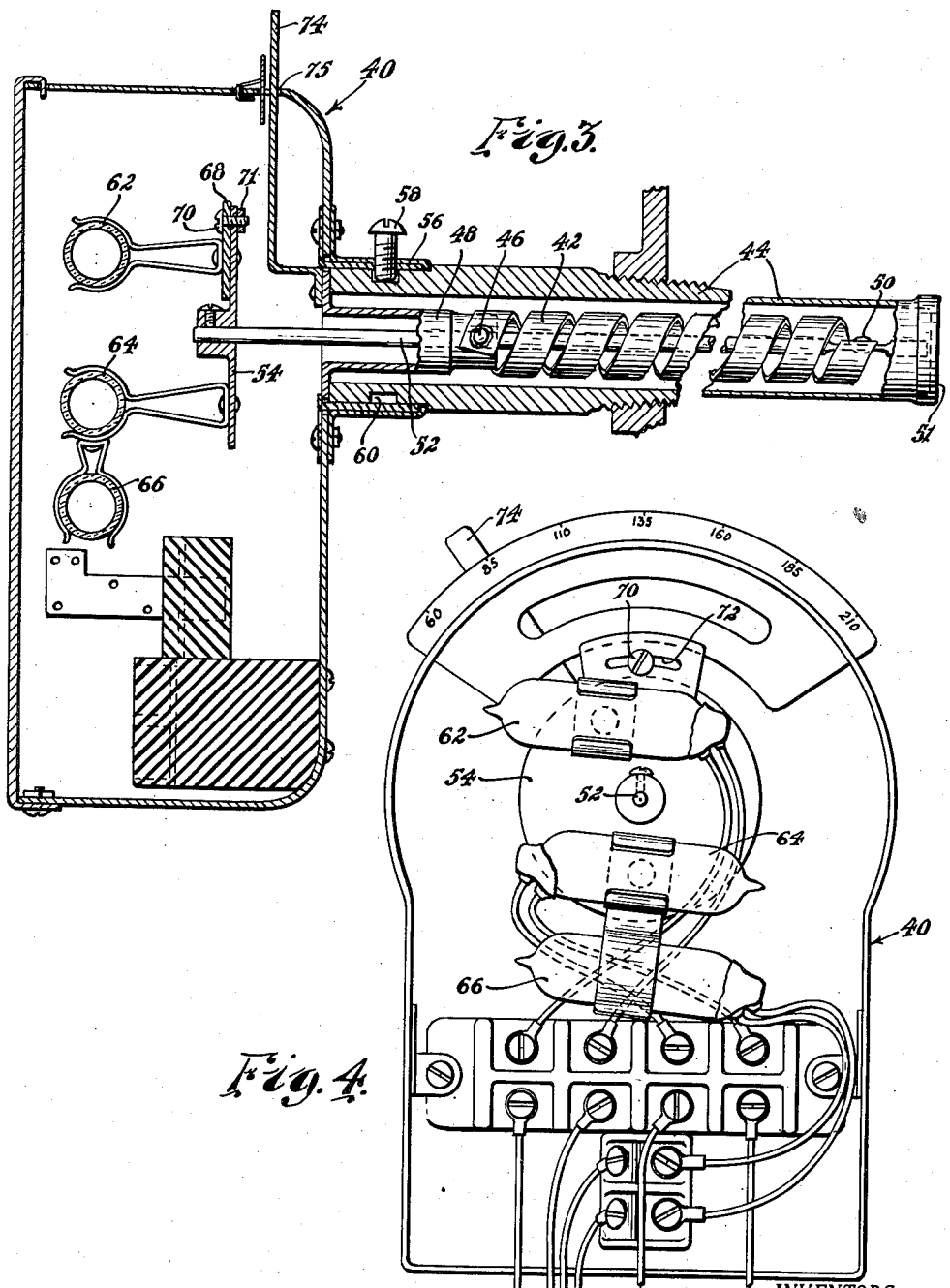

United States Patent Office 2,830,764
Patented Apr. 15, 1958

2,830,764

CONTROL APPARATUS FOR HOT WATER HEATING SYSTEMS

John J. McGillis and Hugh D. McGillis, Brockton, Mass.

Application December 7, 1953, Serial No. 396,531

5 Claims. (Cl. 236—9)

This invention relates to improvements in control apparatus for hot water heating systems. More particularly the invention relates to control apparatus for hot water heating systems which include a circulating pump for forced circulation of hot water through the system and wherein a tankless hot water heater, or the like, may be connected to the boiler or furnace to supply hot water for domestic purposes. The invention simplifies and makes more sensitively responsive and positive the automatic control of such systems as compared with the prior comparable control mechanisms and devices of which we are aware.

It is among the objects of the invention to provide a control apparatus for hot water heating systems wherein the temperature of the water in the furnace or boiler dominates the control of an oil burner, or other heat-generating mechanism, and wherein a circulating pump operates only when the temperature of said water is above a predetermined temperature which may be selected to suit any particular conditions or desires. According to the invention, a room thermostat may start operation of the oil burner if and when the boiler water temperature is below a predetermined temperature at which a boiler water temperature-responsive device opens the burner motor circuit regardless of the condition of the room thermostat, and a circulating pump control switch responds to start the pump, only if and when the boiler water temperature is close to or above the temperature at which said boiler water temperature-responsive device responds to open the burner motor circuit.

Another object of the invention is to provide control apparatus for a hot water heating system which permits the temperature of the water in the furnace or boiler to be elevated to and maintained substantially at any relatively high temperature which is below a selected maximum temperature, with a circulating pump controlled to operate only when the boiler water temperature is at or above a predetermined relatively high temperature regardless of the condition of a room thermostat in the system.

A further object of the invention is to provide a hot water heating system control apparatus which is responsive to room temperature, stack temperature and boiler water temperature, with the room thermostat operative to start a heat-generating means only if there is substantial stack temperature and the boiler water is below a predetermined relatively high temperature, and with a boiler water temperature responsive device operative to stop the heat-generating means at a predetermined relatively high boiler water temperature, and with a circulating pump operative only when the boiler water is at or above a predetermined relatively high temperature.

It is, moreover, our purpose and object generally to improve hot water heating system controls and more especially to provide control apparatus for such a system whereby the hot water may be maintained substantially at any predetermined relatively high safe temperature which may be selected to suit particular conditions or desires.

In the accompanying drawings:

Fig. 3 is a cross-sectional view of our improved boiler water temperature-responsive unit and shows a fragment of the boiler wall on which the unit is mounted; and Fig. 4 is a front elevation of the unit of Fig. 3 with the front cover thereof removed.

Figures 1, 2:
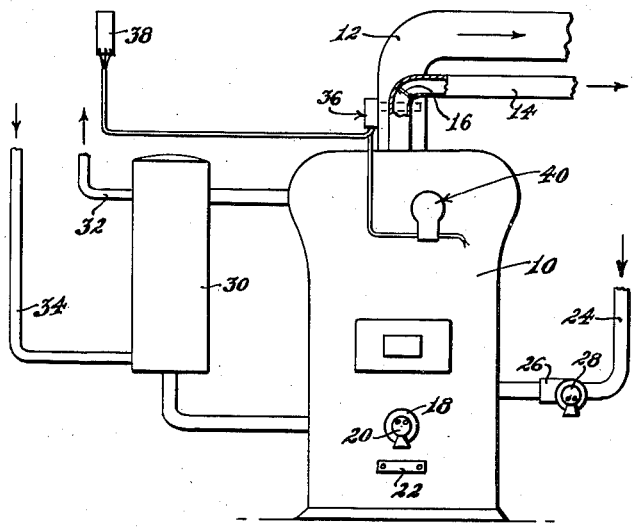
Fig. 1 is a diagrammatic representation of a hot water heating system having control apparatus embodying features of the invention associated therewith.
Fig. 2 is a wiring diagram embodying features of our improved control apparatus.

Referring to Fig. 1 of the drawings, a conventional hot water boiler 10 has a usual flue pipe or stack 12 connected thereto, and has a conventional hot water distribution conduit 14 leading from its dome, with the conventional angularly disposed check valve 16 therein which opens in the direction of flow in conduit 14 from the boiler to the radiators (not shown) of the heating system. A conventional oil burner, or the like, is represented at 18 adapted to be driven by the burner motor 20 when the motor 20 and the associated ignition means 22 are energized. The water return conduit 24 leading from the radiators back to the boiler 10 has a circulating pump 26 therein adjacent to the boiler for forced circulation of hot water through the system when the pump motor 28 is operating.

In the embodiment of Fig. 1, a tankless hot water heater 30 is shown connected to boiler 10 for supplying domestic hot water by means of the circulatory pipes 32, 34 which are connected to opposite ends of the usual interior coil of the hot water heater 30.

A well known variety of stack safety relay unit is represented generally at 36, and a low voltage room thermostat is indicated at 38.

According to the invention, a novel boiler water temperature control unit, indicated generally at 40, is mounted at a convenient location on the dome portion of boiler 10 and exercises a superior type of control of the hot water system, in conjunction with the stack safety relay unit 36 and the room thermostat 38.

As best seen in Figs. 3 and 4, the boiler water temperature control unit 40 comprises a suitable temperature-responsive element 42 sealed within a tubular projection 44 which extends through the boiler wall into the water within the dome of the boiler. The responsive element 42 is herein represented as a helically wound strip having one end fixed at 46 to a relatively fixed tubular projection 48. The other end of strip element 42 is secured at 50 to one end of a rod 52 which extends axially through the helix and through the tubular projection 48 and has a disk 54 secured on its extending end portion within the casing of unit 40.

The inner open end of tubular projection 44 fits nicely within a projecting sleeve 56 on the rear wall of the casing of unit 40 whereby the temperature-responsive helix 42 may be inserted within tubular projection 44 and be secured therein by a set screw 58 which is threaded through the casing sleeve 56 into engagement with the bottom wall of an annular groove 60 in that portion of the tubular projection 44 which is within sleeve 56.

Disk 54 has three mercury switches 62, 64, 66 mounted thereon, each being of a conventional type having a quantity of mercury sealed within a glass bulb, with two electric terminals at one end of the bulb adapted to be bridged by the mercury when the bulb is tilted in direction to cause the mercury to be at, or to flow to, the terminal end of the bulb.

As best seen in Fig. 3, all three of the mercury switches 62, 64, 66 are mounted on the front face of disk 54 and each has its longitudinal axis tilted from horizontal when the switches are in their relative positions of Fig. 4. However, the switches 62, 66 are arranged with their electric terminals at the lower ends of the tilted bulbs and the mercury in the bulbs of these switches 62, 66 will be at the terminal ends of the bulbs in Fig. 4, bridging the two terminals of each of the switches 62, 66. The other switch 64 has its electric terminals at that end of the switch bulb which is uppermost in Fig. 4 with the mercury at the lower end of this bulb, whereby switch 64 is open in Fig. 4.

In the representation of Fig. 4, it is important that switch 62 be tilted from horizontal less than the tilt of switch 64, and that switch 64 be tilted from horizontal less than the tilt of switch 66, whereby a counter-clockwise rotation of disk 54 (as viewed in Fig. 4) will first cause opening of switch 62 while switch 66 continues closed and, if the counter-clockwise rotation of disk 54 continues, the switch 64 will close while switch 66 continues closed. But a relatively slight further counter-clockwise rotation of disk 54 will cause opening of switch 66.

If desired, each of the switches 62, 64, 66 may be independently adjustable on disk 54. Ordinarily, however, it will be found sufficient to provide for adjustment of only the switch 62 on the disk and to fix the other two switches 64, 66 on the disk with predetermined different tilts thereof from horizontal, and to provide for adjustment of the disk 54 about its axis. As shown, switch 62 is adjustable on disk 54 by being mounted on a plate element 68 which may be secured in adjusted positions on disk 54 by means of a screw 70 which passes through a slot 72 in plate element 68 and through a hole in disk 54, with a nut 71 on the end of the screw. Disk 54 may be adjusted by means of a lever 74 on the relatively fixed tubular projection 48. The lever extends out of the casing through a slot 75 therein along which the lever may be moved to rotate the connection 46 of strip 42 relatively to the fixed tubular projection 44 and thereby change the tilt of all of the switches 62, 64, 66.

The operation of my improved control apparatus will be best understood by reference to the electrical diagram of Fig. 2, wherein the stack safety relay unit 36 is represented as comprising a transformer 78, ignition relay 80, motor relay 82, safety switch 84, and temperature-responsive element 86 which latter controls the relays 80, 82. The room thermostat 38 is connected to the terminals 88, 90, 92 of the unit 36. Mercury switch 62 is connected to the terminals 90, 92 of unit 36, and one side of mercury switch 66 is connected to a terminal 94 of unit 36 and has its other side connected to the positive side of a 110 v. line, indicated at 96. The mercury switch 64 has one side connected to the positive side of line 96 and has its other side connected through the pump motor 28 to the negative side of the line 96. Burner motor 20 has one side connected to the negative side of line 96 and has its other side connected to a terminal 98 of unit 36. The ignition means 22 has one side connected to the negative side of line 96 and has its other side connected to a terminal 100 of unit 36. Still another terminal 102 of unit 36 is connected directly to the negative side of line 96.

The internal wiring of stack unit 36 is the conventional wiring wherein the primary of transformer 78 is connected to the terminals 94 and 102 of the unit.

In Fig. 2, it is assumed that the system is cold and that the stack unit temperature-responsive element 86 is contracted. Hence, element 86 is holding the contacts 104, 106, 108 closed thereby completing the secondary transformer circuit through the ignition relay coil 110. Closing of ignition relay 80 energizes the ignition means 22 and conditions the unit 36 for closing of the motor relay 82 which results in starting of burner motor 20. Closing of the motor relay 82 is in response to energization of the motor relay coil 112 whose transformer secondary circuit includes ignition relay contacts 114, 116, the closed safety switch 84 and the closed mercury switch 62.

Soon after the oil burner 18 starts, the stack temperature causes gradual expansion of responsive element 86 and switch contact 118 moves into engagement with contact 120, followed by movement of switch contact 104 away from contact 106 to de-energize the ignition relay coil 110. Upon opening of ignition relay 80, the ignition means 22 is de-energized, and the motor relay coil 112 continues to be energized through the closed switch contacts 118, 120, the motor relay contacts 122, 124, mercury switch 62 and safety switch 84, but the circuit now by-passes the heater of the safety switch 84.

As the boiler water temperature increases, with continued operation of the oil burner 18, the temperature-responsive element 42 of unit 40 responds by gradually rotating disk 54 counter-clockwise, as viewed in Figs. 2 and 4. The mercury switch 62 may be adjusted to open at a predetermined temperature of the boiler water, at which time the motor relay opens and the oil burner 18 stops, unless the room thermostat is calling for heat. By properly adjusting lever 74 of unit 40, in conjunction with the adjustment of mercury switch 62, the mercury switch 64 may be positioned to close and start the circulating pump 26 when the boiler water reaches a predetermined temperature and, as the forced circulation of the hot water through the system lowers the temperature of the boiler water, the mercury switch 62 will re-close and mercury switch 64 will open to repeat the previously described burner-starting cycle. Mercury switch 66 is a safety switch for de-energizing the entire control system in case the boiler water temperature, for any reason, should rise above a predetermined maximum safe operating temperature. However, switch 64 which controls the circulating pump motor 28 is in a separate circuit not affected by the mercury switches 62, 66. Hence, the pump 26 can operate whenever the boiler water temperature is at or above the predetermined temperature at which switch 64 closes, even though safety switch 66 may have opened to de-energize the burner motor control system. This is important in that the safety switch may open with the boiler water at a high temperature which might persist for a considerable time after switch 66 opens. In accordance with the present invention the circulating pump 28 operates after safety switch 66 opens thereby to reduce the boiler water temperature until switch 62 closes to again start the burner motor 20. Obviously, any desired number of additional circulating pumps may be connected in series with the pump 28.

It will be apparent from the foregoing description, in connection with the drawings, that our improved control apparatus eliminates the need for a pump relay and for a limit Aquastat control unit, both of which, so far as we are aware, have been requisite in prior comparable control systems. Substantial savings in installation costs are thereby accomplished while providing an apparatus which is more sensitively responsive and positive in action. Also, our improved hot water heating system control permits build-up of the boiler water temperature to any temperature desired up to a predetermined maximum safety limit independently of any calls for heat by the room thermostat which enables the domestic hot water supply temperature to be maintained within satisfactory limits as compared with the prior comparable controls which customarily have the circulating pump operating unnecessarily in response to calls for heat by the room thermostat. Our circulating pump operates only in response to increase of boiler water temperature above a predetermined temperature which may be selected to suit any particular conditions or desires, and operates only until the boiler water temperature drops below another predetermined temperature which may be selected to suit particular conditions or desires.

It is intended that the patent shall cover, by suitable expression in the appended claims, whatever features of patentable novelty exist in the invention disclosed.

We claim as our invention:

1. In a hot water heating system comprising a heater having a stack leading therefrom, and having a water chamber therein, a motor-driven heat-generating means, conduits for conducting hot water from and for returning the water to said water chamber, and a motor-driven pump in the return conduit, control apparatus for said system comprising an electrical circuit wherein there is a room thermostat, a stack-temperature-responsive means, and a thermally responsive device responsive to the temperature of water in said water chamber, means providing another electrical circuit for operating the motor of said pump independently of said room thermostat under all conditions but only when the temperature of the water in said water chamber is above a predetermined relatively high temperature, said pump-motor circuit including a switch which opens and closes to de-energize and energize said pump motor circuit entirely in response to said thermally responsive device which responds to the water temperature in said water chamber.

2. In a hot water heating system comprising a heater having a stack leading therefrom, and having a water chamber therein, a motor-driven heat-generating means, conduits for conducting hot water from and for returning the water to said water chamber, and a motor-driven pump in the return conduit, control apparatus for said system comprising a room thermostat, a stack-temperature-responsive means, and a thermally responsive device responsive to the temperature of water in said water chamber, means providing an electric circuit for operating the motor of said heat-generating means when the stack temperature is below a predetermined temperature, said circuit having said room thermostat and a switch in parallel therein whereby said motor of the heat-generating means may be operated in response to a call for heat by said thermostat and in response to closing of said switch, said switch being responsive to said thermally responsive device which responds to the temperature of water in said water chamber whereby said switch opens the circuit when the water in said chamber reaches a predetermined relatively high temperature, means providing another electric circuit for operating the motor of said pump independently of said room thermostat only when the temperature of the water in said water chamber rises to a temperature which approximates said predetermined relatively high temperature at which said switch opens the first mentioned circuit, said pump-motor circuit including a switch which is entirely responsive to said thermally responsive device which responds to the temperature of the water in said water chamber.

3. In a hot water heating system comprising a heater having a water chamber therein, a motor-driven heat generating means, conduits for conducting hot water from and for returning the water to said water chamber, and a motor-driven pump in the return conduit, control apparatus for said system comprising a room thermostat, and a thermally responsive device responsive to temperature of the water in said water chamber, means providing an electric circuit for operating the motor of said heat-generating means, said circuit including said thermostat and a switch in parallel with the thermostat, said switch being responsive to said thermally responsive device for opening the circuit to the motor of said heat-generating means when the temperature of water in said chamber reaches a predetermined relatively high temperature, means providing another electric circuit for operating the motor of said pump independently of said room thermostat in response to temperature rise of said water a little above the said perdetermined relatively high temperature, means providing another electric circuit for operating the motor of said pump independently of said room thermostat in response to temperature rise of said water a little above the said predetermined relatively high temperature, the latter said circuit including a switch, means supporting both of said switches for rotation in unison when said thermally responsive device responds to temperature changes of the water in said water chamber, said switches being relatively arranged so that the first mentioned switch opens in response to said predetermined relatively high temperature of the water in said water chamber, thereby to open the circuit to the motor of said heat-generating means, and so that the second mentioned switch closes only if and when the temperature of said water rises appreciably above said predetermined relatively high temperature, thereby to close the circuit to the motor of said pump only when the temperature of said water is relatively high and regardless of the condition of said thermostat and said circuit of the heat-generating means.

4. In a hot water heating system comprising a heater having a water chamber therein, a motor-driven heat-generating means, conduits for conducting hot water from and for returning the water to said water chamber, and a motor driven pump for circulating the water in said conduits, control apparatus for said system comprising an electric circuit for operating the motor of said heat-generating means, a room thermostat in said circuit, and another electric circuit for operating the motor of said circulating pump independently of said room thermostat under all conditions, a mercury switch in each of said circuits, means supporting said switches for unitary movements thereof to and from open and closed positions thereof, and thermally responsive means responsive to the temperature of said water and adapted to move said switch supporting means, the relative arrangement of said switches being such that the switch in the first mentioned circuit opens in response to a predetermined relatively high temperature of said water to open the circuit to said heat-generating means, and the switch in the second mentioned circuit closes only if and when the temperature of said water rises appreciably above said predetermined relatively high temperature.

5. In a hot water heating system comprising a heater having a water chamber therein, a motor-driven heat-generating means, conduits for conducting hot water from and for returning the water to said water chamber, and a motor driven pump for circulating the water in said conduits, control apparatus for said system comprising an electric circuit for operating the motor of said heat-generating means, a room thermostat in said circuit, and another electric circuit for operating the motor of said circulating pump independently of said room thermostat under all conditions, three mercury switches and means supporting all of the switches for unitary movements thereof to and from open and closed positions, and thermally responsive means responsive to temperature changes of said water for actuating said switch supporting means, one of said switches being in the first mentioned circuit for opening that circuit in response to a predetermined relatively high temperature of said water, and a second one of said switches being in the second mentioned circuit for closing that circuit to start the pump motor only if and when the temperature of said water rises appreciably above said predetermined relatively high temperature of said water and regardless of the condition of the first mentioned circuit, and the third one of said switches being connected for opening only the first mentioned circuit if and when the temperature of said water reaches a temperature substantially above said predetermined relatively high temperature.

References Cited in the file of this patent

UNITED STATES PATENTS

| 1,882,341 | Stem | Oct. 11, 1932 |
| 2,008,568 | Snavely | July 16, 1935 |
| 2,073,676 | Broderick | Mar. 16, 1937 |
| 2,266,563 | McCorkle | Dec. 16, 1941 |
| 2,274,177 | Wilson | Feb. 24, 1942 |
| 2,312,353 | Miller | Mar. 2, 1943 |